Figure 1:
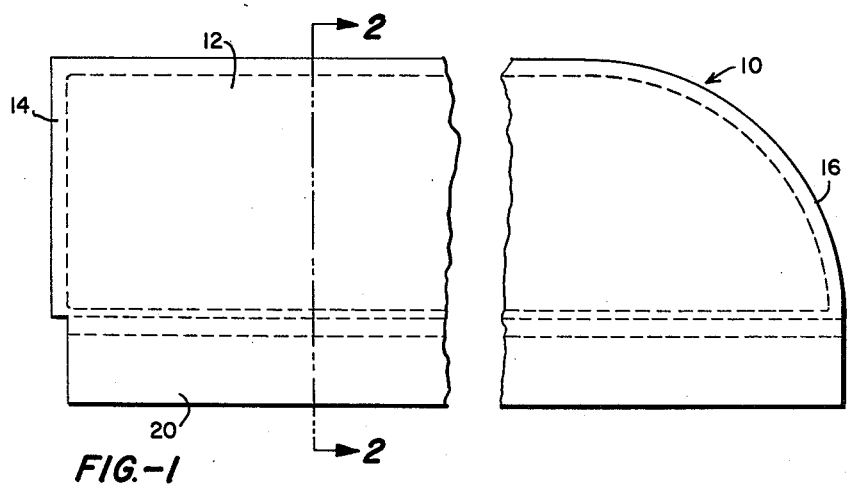

Feb. 16, 1965   R. B. MILLER   3,169,756
PNEUMATIC CUSHION
Filed July 20, 1962

INVENTOR.
RUSSELL B. MILLER
BY
Oldham & Oldham
ATTORNEYS

United States Patent Office 3,169,756
Patented Feb. 16, 1965

3,169,756
PNEUMATIC CUSHION
Russell B. Miller, Akron, Ohio, assignor to Barberton Plastics Products, Inc., Barberton, Ohio, a corporation of Ohio
Filed July 20, 1962, Ser. No. 211,270
3 Claims. (Cl. 267—1)

This invention relates to pneumatic cushions for use on boats, boat docks, and the like, and to methods for making such cushions from moldable plastics.

It is the general object of the invention to provide an improved, relatively inexpensive, durable and long-wearing pneumatic cushion having integral means thereon for facilitating the attachment of the cushion to a boat dock, or the like.

Another object of the invention is to provide a pneumatic cushion made of two different plastics integrally bonded and fused together, one relatively soft and flexible plastic forming a hollow body portion which is pneumatically inflated, and the other plastic being relatively hard and stiff, and providing a backing for the first plastic and providing attaching flanges whereby the pneumatic cushion can be secured to an object to be cushioned.

Another object of the invention is the provision of an improved, readily practiced, rapid, and comparatively inexpensive method for producing the pneumatic cushion defined in the other objects of the invention.

The foregoing objects of the invention, and others which will become apparent as the description proceeds, are achieved by the provision of a pneumatic cushion made from two plastics of different softness, one plastic being relatively soft and flexible and formed as a hollow body of substantially half cylinder shape, the hollow body being inflated with air under pressure, the other plastic being relatively stiff and hard and having a flat portion integrally joined with the flat side of the hollow body to hold it flat even when inflated, and flanges integral with and on the flat portion and extending beyond the hollow body and being of the other plastic and relatively stiff and hard and whereby the cushion can be secured to any object to be cushioned.

In terms of method the invention provides that method of making a pneumatic cushion which includes the steps of pouring gelable plastic into a hollow mold having the bottom of the cavity of channel shape and the top of the cavity of substantially half cylinder shape, the plastic being of a type to set relatively stiff and hard and in an amount to substantially fill the channel shape of the bottom of the cavity, heating the mold while stationary to gel but not fully set the plastic, pouring a measured charge less than that required to fill the remainder of the cavity and of a plastic which is relatively soft and flexible when set into the mold, heating the mold and rotating it on compound axes to first gel and then set up the second plastic as a hollow body and to set up the first plastic, stopping the mold rotation, cooling the mold, removing the compound material article from the mold, inflating the hollow body with air through a hollow needle, and sealing the needle hole.

Figure 2:
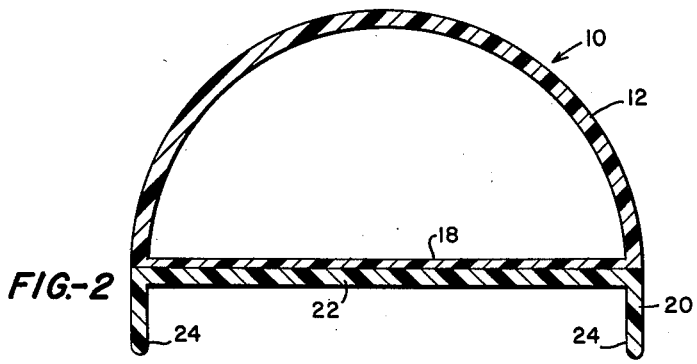
Figures 3, 4:
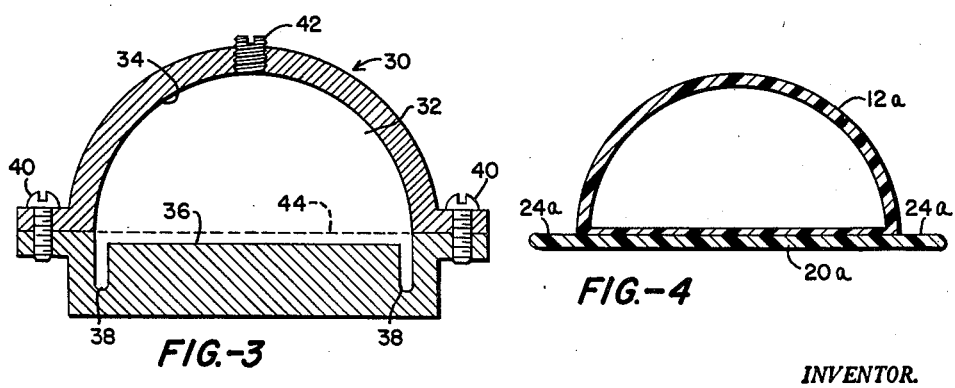

For a better understanding of the invention reference should be had to the accompanying drawings wherein
FIG. 1 is a side elevation, partially broken away, of one embodiment of the cushion of the invention;
FIG. 2 is a cross-sectional view, taken substantially on line 2—2, of FIG. 1;
FIG. 3 is a cross-sectional view, on a somewhat reduced scale, of a mold employed in the method of the invention; and
FIG. 4 is a view similar to FIG. 2, but on a reduced scale, of a modification of the invention.

In the drawings, the numeral 10 indicates generally a pneumatic cushion having a hollow body portion 12 of substantially half cylinder shape and formed of a relatively soft and flexible plastic. In a typical embodiment of the invention, the hollow body 12 is made of a plastic having a Shore durometer hardness of Type A of about 78±5. The particular plastic employed is usually a vinyl plastisol although other plastics may be used including dispersions of vinyl resins plus acrylic monomers, polyethylene, and the like.

The hollow body 12 may be formed with one flat end 14 and one longitudinally curved end 16 so that the flat ends 14 of a pair of the pneumatic cushions can be butted together to form a longer cushion, should this be desired. Usually the pneumatic cushions 10 are made in several different lengths so that the particular length desired can be selected to best adapt the cushion to a particular job. The hollow half cylindrical body 12 has a flat bottom portion 18 having a wall thickness usually somewhat thinner than the wall thickness of the cylindrical portion of the body, and the hollow body 12 is inflated with gas or air under pressure to provide an excellent pneumatic cushioning action.

The flat end 14 of the form of the invention of FIG. 1 may be molded to extend slightly beyond the end of the channel-shaped portion 20. This insures a smooth, crackfree butting together of several of the cushions when used end to end.

As best seen in FIG. 2, formed integrally with the bottom of the hollow body 12 is a channel-shaped plastic portion 20 made of a relatively stiff and hard plastic. In a typical embodiment of the invention the channel-shaped portion 20 of the pneumatic cushion has a Shore durometer hardness of Type D of about 65±5. The plastic of the channel-shaped portion 20 should have an affinity for and an integral bonding action with the plastic of the hollow body 12, and normally the plastic of the channel portion 12 is the same as the plastic of the hollow body 12 but is compounded to provide the different hardness specified. For example, the soft plastic is a vinyl plastisol, and the harder plastic is a vinyl dispersion-acrylic monomer.

In any event, the flat bottom 22 of the channel-shaped portion 20 is bonded integrally with or fused with the flat bottom 18 of the hollow body 12, and the flat bottom 22 is sufficiently stiff and rigid so that the inflation of the hollow body 12 does not adversely or objectionably curve or round the flat bottom 22. Formed integrally with the flat bottom 22 of the channel 20 are flanges 24 which extend tangentially of the cylindrical sides of the hollow body 12, with the flanges 24 serving as attaching means for securing the pneumatic cushion in place on a dock, or the like, to be cushioned.

In one specific embodiment of the invention the flanges 24 are spaced apart a distance such as to fit snugly over the sides of a two-by-four, the flanges 24 being secured to the sides of the two-by-four by screws, nails, adhesive, or the like.

The embodiment of the invention illustrated in FIG. 4 includes a hollow body 12a of relatively soft and flexible plastic, again of a half cylindrical shape, this body being integrally bonded or fused to a flat base portion 20a having integral attaching flanges 24a lying in the plane of the flat base portion 20a. The flat base portion 20a and the flanges 24a are formed of a relatively hard and stiff plastic, such as has been previously described.

In the performance of the method of the invention, this is normally done with the aid of a mold indicated generally by the numeral 30 in FIG. 3. The mold 30 is of metal and has a cavity 32 having an upper portion 34 of half or substantially half cylindrical shape and a lower portion 36 which is relatively flat, and which may be provided with longitudinally extending grooves 38 for forming the flanges 24 of the pneumatic cushion of FIG. 2. The mold 30 is normally made in two halves, as illustrated, these halves being releasably secured together by screws 40. The mold is also provided with a removable screw plug 42 which allows the introduction of plastic materials into the mold even when the mold parts are held together by the screws 40. In the method of the invention with the mold closed by the screws 40 the screw plug 42 is removed and a sufficient quantity of plastic is poured into the mold to substantially fill the mold to the line 44. This plastic is of the type which sets up relatively stiff and hard. Heat is now applied to the mold 30 to cause the plastic filling the mold to the line 44 to gel. During the application of heat the mold 30 is held stationary. With the plastic filling the mold to the line 44 gelled, additional plastic is now poured into the mold 30 through the opening for the screw plug 42, and this plastic is of the type which sets up to be relatively soft and flexible. The amount of plastic introduced into the mold is less than the remaining cavity of the mold and is in an amount sufficient to form the hollow body portion of the pneumatic cushion. The screw plug 42 is now returned to the mold to close it, and the mold 30 is now heated and at the same time is rotated on compound axes to distribute the second plastic over the interior surface of the mold cavity and over the exposed surface of the gelled hard plastic. Heat and rotation are continued until the second soft plastic is first gelled and then finally fused or set up and the first plastic is likewise set up whereupon rotation of the mold is stopped, the mold is cooled, the screws 40 of the mold are removed and the mold is opened and the pneumatic cushion is removed.

Air under pressure is now introduced to the inside of the hollow body portion of the pneumatic cushion, usually by means of a hollow needle, and the needle hole is sealed.

The pneumatic cushion produced by the method described provides a pneumatic cushion which appears to be and which is an integral one-piece plastic member, but which has certain portions of the plastic which are relatively stiff and hard, these portions being adapted to secure the pneumatic cushion to an object to be cushioned, and with other portions of the pneumatic cushion being relatively soft and flexible and internally inflated so as to provide the desired cushioning action.

The term "set up," as employed in the specification and claims, is intended to cover the curing or fusing of the material molded to form the desired finished product upon cooling and removal from the mold.

While a certain representative embodiment and details have been shown for the purpose of illustrating the invention, it will be apparent to those skilled in this art that various changes and modifications may be made therein without departing from the spirit or scope of the invention.

What is claimed is:

1. A pneumatic cushion adapted to be secured to a dock and the like and including a channel-shaped base of relative stiff and hard vinyl plastisol having a Shore durometer hardness of Type D of about 65±5, a hollow closed, fluid impervious relatively soft and flexible body of vinyl plastisol and having a Shore durometer hardness of Type A of about 78±5 and of substantially a half cylinder shape, the flat side of the half cylinder body being thinner in wall thickness than the half cylinder wall thereof and being integrally bonded to the upper side of the channel-shaped base so that the outer surfaces of the flanges of the channel-shaped base are substantially tangent to the sides of the half cylinder body to be attached to a surface to be cushioned, the soft and flexible body of plastic being internally inflated with gas under pressure to provide pneumatic cushioning of objects striking thereagainst, and with at least one end of the soft and flexible body being rounded longitudinally.

2. A pneumatic cushion made from two plastics of different softness, one plastic being relatively soft and flexible and formed as a hollow closed fluid impervious body of substantially half cylinder shape, the hollow body being inflated with air under pressure, the other plastic being relatively stiff and hard and having a flat portion molded in integral relation with the flat side of the hollow body to hold it flat even when inflated, and flanges integral with and on the flat portion and extending in the same plane as the flat portion beyond the hollow body and being of the other plastic and relatively stiff and hard and whereby the flanges of the flat portion of the cushion can be secured to any object to be cushioned as the flat portion is placed in adjacent relation thereto.

3. A pneumatic cushion according to claim 2 where the relatively soft plastic is a vinyl plastisol having a Shore durometer hardness of Type A of about 78±5 and where the relatively stiff and hard plastic is a vinyl dispersion-acrylic monomer having a Shore durometer hardness of Type D of about 65±5, and where the plastics are integrally fused together in the presence of heat.

References Cited in the file of this patent

UNITED STATES PATENTS

| | | |
|---|---|---|
| 1,666,234 | Cullen | Apr. 17, 1928 |
| 2,530,160 | Finley | Nov. 14, 1950 |
| 2,709,471 | Smith | May 31, 1955 |
| 2,829,915 | Claveau | Apr. 8, 1958 |
| 2,839,788 | Dembiak | June 24, 1958 |
| 2,848,725 | Sloulin | Aug. 26, 1958 |
| 2,926,904 | Erlbacher | Mar. 1, 1960 |
| 2,935,855 | Reid | May 10, 1960 |
| 3,014,710 | Layne | Dec. 26, 1961 |
| 3,040,384 | Whittington | June 26, 1962 |